United States Patent [19]

Lyon et al.

[11] 4,155,344
[45] May 22, 1979

[54] AIR-HEATING SOLAR COLLECTOR

[75] Inventors: Floyd A. Lyon, Brookville; Henry Harrison, Locust Valley, both of N.Y.

[73] Assignee: Halm Instrument Co., Inc., Glen Head, N.Y.

[21] Appl. No.: 875,429

[22] Filed: Feb. 6, 1978

Related U.S. Application Data

[62] Division of Ser. No. 705,669, Jul. 15, 1976, Pat. No. 4,086,909.

[51] Int. Cl.² .................................................. F24J 3/02
[52] U.S. Cl. ...................................... 126/270; 237/1 A
[58] Field of Search .................. 126/270, 271; 237/1 A

[56] References Cited
U.S. PATENT DOCUMENTS

| | | | |
|---|---|---|---|
| 2,680,437 | 6/1954 | Miller | 126/270 |
| 3,919,998 | 11/1975 | Parker | 237/1 A |
| 3,955,555 | 5/1976 | Bostrom | 237/1 A |
| 3,981,445 | 9/1976 | Custer | 237/1 A |
| 3,996,918 | 12/1976 | Quick | 126/270 |
| 4,007,729 | 2/1977 | Chao et al. | 126/271 |
| 4,016,860 | 4/1977 | Moan | 126/270 |
| 4,086,908 | 5/1978 | Werner et al. | 126/270 |

Primary Examiner—Henry C. Yuen
Attorney, Agent, or Firm—James P. Malone

[57] ABSTRACT

An air-heating solar collector having a plurality of parallel, spaced-apart, substantially coextensive translucent sheets and a convoluted air passage passing in succession between successive pairs of said sheets, the air finally passing over a blackened absorber plate, whereby heat escaping from the absorber to the sheets is picked up by air flowing in the convoluted air passage.

2 Claims, 5 Drawing Figures

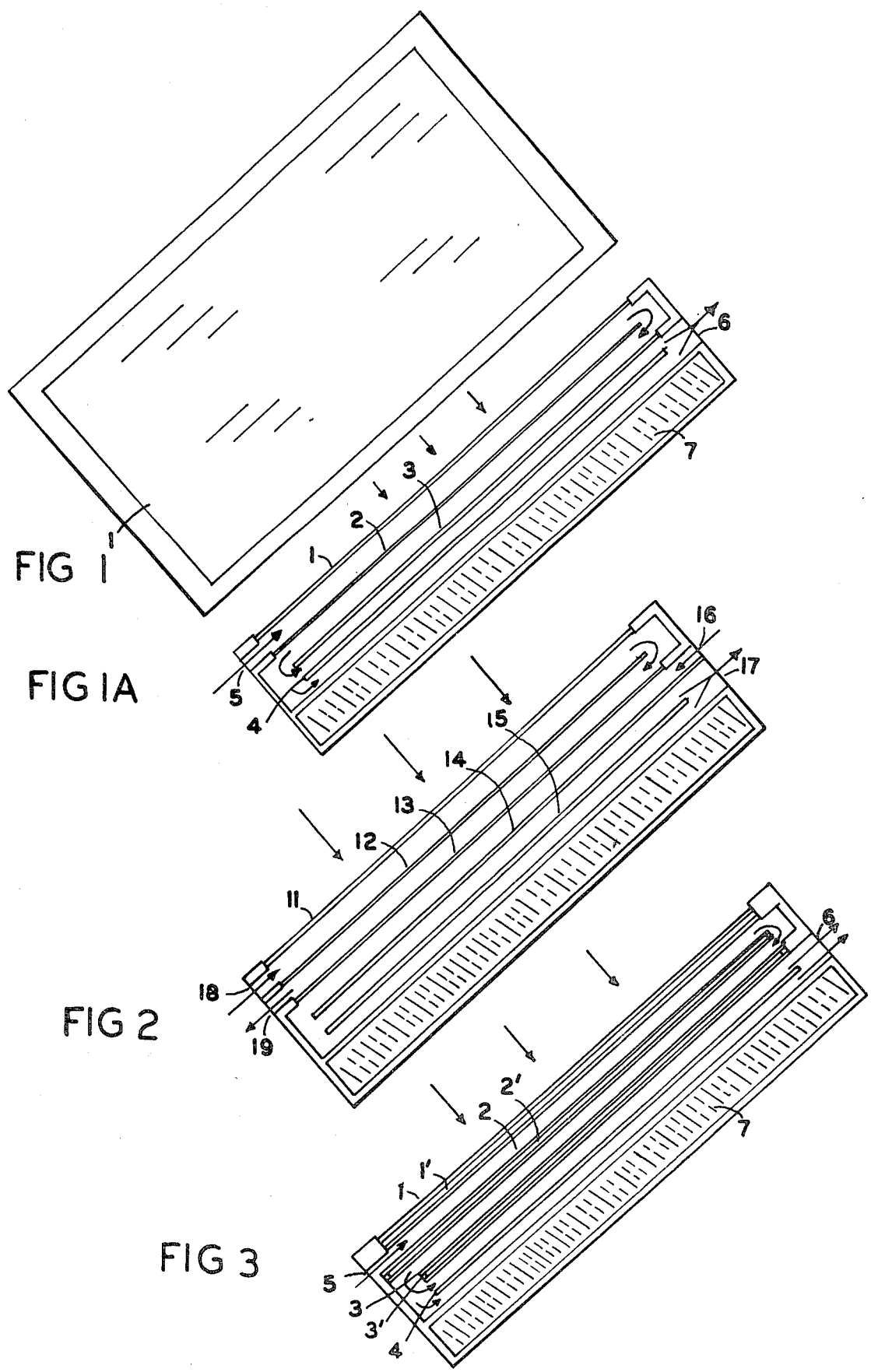

AIR-HEATING SOLAR COLLECTOR

This is a division of application Ser. No. 705,669, filed July 15, 1976, now U.S. Pat. No. 4,086,909.

The typical air-heating solar collector has a transparent front cover through which the sunlight shines, striking a blackened absorber surface, where it is converted to heat. Air flows in contact with the absorber surface, becoming heated by conduction, to carry heat away to a utilization device or system.

The effectiveness of a solar collector is dependent on the proportion of the heat collected that is carried away by the air. Heat losses from the air stream and from the absorber surface can take place by radiation and by conduction through the surfaces of the collector. The back and sidewalls of the collector are generally covered with insulation of a thickness sufficient to make conduction losses there small, but insulating the transparent front surface is important also, and requires special means.

The transparent front cover of an air collector receives heat from the air in contact with it and by radiation from warmer surfaces which it "sees". In the simplest air collectors the front cover is separated from the absorber surface only by air. The absorber surface, which does not readily pass its heat to the air in contact with it because of the low heat conductivity of air, reaches relatively high temperatures, which causes it to emit infra-red radiation which is absorbed by the front cover, and is thus lost to the outside air.

In the structure of this invention, however, that infra-red radiation is intercepted by an intermediate light transparent sheet, which thereby becomes heated. The air passage is convoluted or folded to pass over this intermediate light-transparent sheet before it passes over the primary absorbing surface. Thus, the light-transparent sheet is cooled by the air stream, so the amount of infra-red radiation it sends to the front cover is reduced and thus there is less heating of and loss of heat by the front cover. Additional transparent sheets and convolutions of the air passage further reduce the losses so that a very high proportion of the absorbed solar energy is retained in the air stream, even where the primary absorber reaches a much higher temperature than the output air stream.

When the desired use temperature is much above the ambient "outside" temperature, or when a relatively ineffective heat transfer device is employed in "utilization," it becomes desirable to recycle the used air. Otherwise, the heat wasted by warming ambient air to the final used air temperature becomes a large proportion of the heat collected.

Since recirculated air has a temperature above ambient, it will, in the collector so far described, lose heat to the front cover by conduction, and this loss reduces the overall efficiency of the system. A conventional way of reducing this loss is to provide a second transparent front cover separated from the first by a dead air space.

This invention provides another way of reducing heat loss. The air stream is divided into two portions, occupying different temperature zones. The secondary portion flowing next to the cover is at substantially ambient temperature, but, convoluted around a transparent plate, it comes in contact with a third transparent plate behing which flows the recirculating "used" air. Thus, the secondary portion picks up nearly all the heat lost from the "used" air stream. The secondary portion air stream is then drawn off from the collector through an independent outlet.

The outlet temperature of this secondary air stream portion can be regulated by controlling its flow rate. Thus, if a fixed output temperature is desired, the flow rate must increase with increasing ambient temperature and also with increasing "used" air temperature. This is best accomplished by servo-control of the flow rate to produce the desired temperature in response to a sensor in the outlet of the secondary air stream.

Accordingly, it is the principal object of this invention to provide an air heating solar collector which efficiently absorbs heat from the sun and delivers it in a heated air stream.

Another object of the invention is to provide an air heating solar collector which has a convoluted air passage to prevent the escape of absorbed heat through the transparent cover of the collector.

Another object is to prevent heat from warm entering air from escaping through the transparent cover of the collector.

Another object is to provide means for maintaining the outlet air of the secondary air flow at a useful temperature.

Another object of the invention is to provide an air-heating solar collector comprising a plurality of parallel, spaced-apart, substantially coextensive translucent sheets forming a convoluted air passage passing in succession between successive pairs of said sheets, a blackened absorber plate mounted parallel to and below said sheets, the air passing finally over the blackened absorber plate, whereby heat escaping from said absorber to said sheets is picked up by air flowing in said convoluted air passage.

We achieve these objects by providing a convoluted air passage such that heat flowing toward the cover is picked up by the cooler entering air stream. Heat from warm entering air is picked up by a secondary convoluted air flow.

It will be apparent to those skilled in the art that these and other objects are achieved by the apparatus described in the following explanation and the drawings.

FIGS. 1 and 1A show a top view and a side sectional view of an embodiment in which entering air at ambient temperature is efficiently heated by traveling in a convoluted path between a plurality of parallel, substantially coextensive light-transparent sheets and finally over a light-absorbing sheet.

FIG. 2 shows a side sectional view of a second embodiment, in which air enters a primary flow path at temperature substantially above ambient, while at the same time air enters a secondary flow path at ambient temperature and exits at an elevated temperature, collecting substantially all the heat which would otherwise escape from the primary flow path through the transparent front cover.

FIG. 3 shows a side sectional view of a variation of the collector of FIG. 1, in which the transparent plates include dead air spaces to reduce conduction of heat through them.

Figure 4:
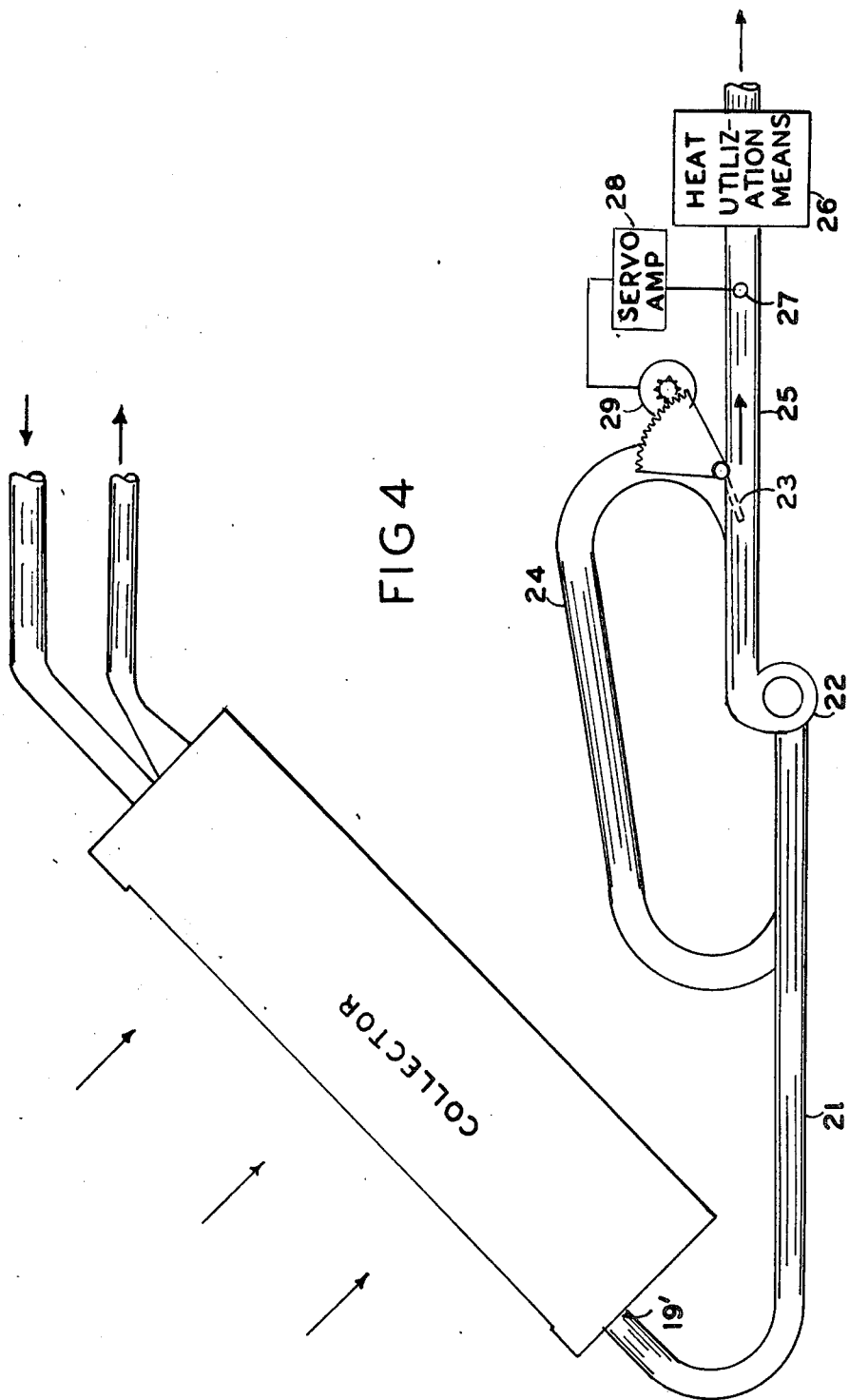
FIG. 4 shows a schematic diagram illustrating a means and method by which the outlet temperature of the secondary air path of the collector of FIG. 3 can be controlled.

In FIG. 1A, a collector is shown which has a translucent cover plate 1, which may be of any material which transmits sunlight, such as glass, methyl-methacrylate, or preferably glass reinforced polyester. Two parallel, coextensive light transmitting sheets, 2 and 3, are shown, and behind them is a blackened metal plate 4, which converts the light reaching it into heat. The convoluted flow of air enters at 5, at the bottom adjacent to the cover 1, bends around the top of sheet 2, and the bottom of sheet 3. It picks up heat from both sides of plate 4, and exits near the top at exit 6.

Escape of heat through the back of the collector is reduced by a layer 7, of insulation which may be fiberglass or any other insulating material sufficiently refractory to withstand the high temperatures expected. Heat from the absorber plate 4, which reaches sheet 3, by radiation, conduction, or convection, is picked up by the cooler air passing between sheets 2 and 3. Similarly, heat from sheet 3, which reaches sheet 2, is picked up by the cooler air flowing between sheets 1 and 2. Thus, only a very small amount of heat reaches sheet 1, to escape from the collector, when the entering air is at ambient temperature.

It will be evident that a greater or smaller number of transparent or translucent sheets could be used, as dictated by economics. Additional sheets each reflect some of the entering sunlight, thereby reducing the amount of light reaching the absorber plate, but they also each decrease the fraction of absorbed energy which escapes through the front of the collector.

Because heat does not flow easily from a hot surface into an air stream, the absorber plate is much hotter than the air leaving the collector at 6. As taught in copending application, Ser. No. 676,548, for SOLAR ENERGY COLLECTOR, filed Apr. 13, 1976, several partially absorbing translucent sheets may be substituted for the single opaque absorber 4, thereby increasing the surface in contact with the air and decreasing the proportion of the heat collected which escapes through the insulation 7.

Passage of heat through the transparent sheets 1, 2 and 3, can be slowed by the construction of FIG. 3. Here these three sheets have each been subdivided into two parallel sheets 1' and 1''; 2' and 2''; and 3' and 3'', each pair being separated by a dead air space. The result is that heat flows less readily from the absorber out through the succesive transparent sheets. This gain in insulation, however, is partially offset by the increased reflection which keeps more radiation from reaching the absorber and by the fact that only one side of each sheet is transmitting heat to the flowing air stream.

FIG. 2 shows a collector which includes both a primary air passage and a secondary air passage. A transparent or translucent cover 11, is followed by a plurality of tanslucent sheets 12, 13, and 14, and a blackened absorber plate 15. Warm air enters the primary air passage at entrance 16, flowing around the top edges of sheet 14, and over both surfaces of the absorber plate 15 before leaving as hot air at exit 17. Air at ambient temperature enters the secondary air passage at the bottom at entrance 18, passing up between sheets 11 and 12, around the top of sheet 12, and down between sheets 12 and 13, to its outlet 19. Air leaving at outlet 19, is cooler than air entering at 16, but warmer than air entering at 18.

As in the collector of FIG. 1, sunlight striking plate 15, heats it to a high temperature, and much of this heat is conducted into the air stream leaving at 17. Heat is prevented from escaping through the back by insulation 20. Heat from the absorber 15, reaching sheet 14, is picked up by the cooler air in the primary passage between sheet 14 and sheet 13. Heat arriving at sheet 13, from sheet 14, is picked up by the cooler air in the secondary passage between sheets 13 and 14, and heat from sheet 13, reaching sheet 12, is picked up by the cooler air between sheets 11 and 12. Thus, nearly all of the heat which escapes from the warmer air in the primary air flow is picked up by the secondary air flow, and available at outlet 19, for any useful heating application. All the plate members are suitably supported at the ends of the collector assembly.

FIG. 4 shows a means and method of controlling the temperature of the outlet air of the secondary air passage. Air leaving a collector secondary air passage outlet 19' passes through a duct 21, to a blower 22. Beyond the blower the flow is divided by a flap valve 23. One portion returns through duct 24, to the inlet of blower 22, and the remaining portion continues through duct 25, to a secondary utilization device 26, from which it is exhausted to the ambient air. A temperature sensor 27, is supported in duct 21, and connects to a servo amplifier 28, which drives a small motor 29, operating the valve 23.

When the temperature at 27, is greater than a desired preset temperature, the motor acts to decrease the flow through duct 24, thereby increasing the flow through the collector. When the temperature at 27, is less than the preset temperature, the motor acts to increase the flow through duct 24, thereby decreasing the flow through the collector. When the temperature at 27 remains greater than the desired temperature for a time substantially longer than the time for full travel of the valve 23, power to the servo motor and power to the fan is preferably shut off.

If all the heat in the secondary air stream is usefully extracted in the secondary utilization device, and air is discharged from it at ambient temperature, the efficiency of the collector system can be very high.

We claim:

1. An air-heating solar collector comprising,
   a plurality of parallel, spaced-apart, substantially coextensive translucent sheets forming a convoluted air passage passing in succession between successive pairs of said sheets,
   a blackened absorber plate mounted parallel to and spaced below said sheets so that the air passes the blackened absorber plate,
   whereby heat escaping from said absorber to said sheets is picked up by air flowing in said convoluted air passage,
   at least one pair of said translucent sheets being separated by a dead air space.

2. An air-heating solar collector according to claim 1, in combination with means for controlling the air flow through said passage in response to its outlet temperature in order to maintain the air issuing from said passage at a desired temperature.

* * * * *